United States Patent [19]

Willner et al.

[11] Patent Number: 5,546,209

[45] Date of Patent: Aug. 13, 1996

[54] ONE-TO-MANY SIMULTANEOUS AND RECONFIGURABLE OPTICAL TWO-DIMENSIONAL PLANE INTERCONNECTIONS USING MULTIPLE WAVELENGTH, VERTICAL CAVITY, SURFACE-EMITTING LASERS AND WAVELENGTH-DEPENDENT DETECTOR PLANES

[75] Inventors: Alan E. Willner, Los Angeles; Constance J. Chang-Hasnain, Stanford; James E. Leight, Pasadena, all of Calif.

[73] Assignees: University of Southern California, Los Angeles; Board of Trustees of the Leland Stanford University, Stanford, both of Calif.

[21] Appl. No.: 209,866

[22] Filed: Mar. 11, 1994

[51] Int. Cl.$^6$ .............................. H04J 14/00; G02B 27/00
[52] U.S. Cl. ...................... 359/115; 359/124; 359/618; 359/885; 359/117; 250/551
[58] Field of Search ........................ 359/117, 139, 359/128, 66, 885, 68, 890, 891, 618, 634, 124, 114, 115; 372/45, 50; 250/551

[56] References Cited

U.S. PATENT DOCUMENTS

| | | | |
|---|---|---|---|
| 5,076,669 | 12/1991 | Black et al. | 359/66 |
| 5,115,441 | 5/1992 | Kopf et al. | 372/45 |
| 5,202,567 | 4/1993 | Hamanaka | 250/551 |
| 5,245,458 | 9/1993 | Taylor | 359/117 |
| 5,266,794 | 11/1993 | Olbright et al. | 250/551 |
| 5,291,324 | 3/1994 | Hinterlong | 359/139 |
| 5,317,453 | 5/1994 | Nishimura et al. | 359/885 |
| 5,325,224 | 6/1994 | Lang et al. | 359/139 |
| 5,325,386 | 6/1994 | Jewell et al. | 372/50 |

FOREIGN PATENT DOCUMENTS

| | | | |
|---|---|---|---|
| 0013831 | 1/1982 | Japan | 359/890 |

OTHER PUBLICATIONS

J. W. Goodman, "Optics as an Interconnect Technology", in *Optical Processing and Computing*, H. H. Arsenault et al, Eds., Academic Press, Inc., New York, pp. 1–32 (1989).

A. Dickinson et al, "Free–space optical interconnection scheme", *Applied Optics*, vol. 20, No. 14, pp. 2001–2005 (10 May 1990).

W. T. Cathey et al, "High Concurrency data bus using arrays of optical emitters and detectors", *Applied Optics*, vol. 18, No. 10, pp. 1687–1691 (15 May 1979).

C. J. Chang-Hasnain et al, "Multiple Wavelength Tunable Surface–Emitting Laser Arrays", IEEE *Journal of Quantum Electronics*, vol. 27, No. 6, pp. 1368–1376 (Jun. 1991).

(List continued on next page.)

*Primary Examiner*—Leo Boudreau
*Assistant Examiner*—Bhavesh Mehta
*Attorney, Agent, or Firm*—Benman Collins & Sawyer

[57] ABSTRACT

Optical communication apparatus for simultaneously and reconfigurably establishing optical communication channels, comprises at least one light source and a plurality of wavelength-selective detectors optically associated with each light source, the detectors arranged one behind another. The apparatus uses wavelength-division-multiplexing (WDM) to facilitate simultaneous and reconfigurable communication of one-to-many 2-D optical planes. This advance dramatically increases the system functionality of optical-plane interconnects. Such a system is realized by incorporating several multiple wavelength vertical-cavity surface-emitting lasers (VCSEL) into each transmitting pixel and incorporating wavelength selectivity into each subsequent detecting plane which will absorb one wavelength and be transparent to the rest; these structures can be fabricated by slightly modifying existing technology. This system allows for increased processing functionality of communicating both simultaneously and reconfigurably between many planes; broadcasting and dynamic independent interconnects are thus enabled.

26 Claims, 9 Drawing Sheets

OTHER PUBLICATIONS

A. E. Willner et al, "2-D WDM Optical Interconnects Using Multiple-Wavelength VCSEL's for Simultaneous and Reconfigurable Communication Among Many Planes", IEEE *Photonics Technology Letters*, vol. 5, No. 7, pp. 838–841 (Jul. 1993).

C. A. Brackett, "Dense Wavelength Division Multiplexing Networks: Principles and Applications", IEEE *Journal on Selected Areas in Communications*, vol. 8, No. 6, pp. 948–964 (Aug. 1990); and.

I. P. Kaminow, "FSK with Direct Detection in Optical Multiple-Access FDM Networks", IEEE *Journal on Selected Areas in Communications*, vol. 8, No. 6, pp. 1005–1014 (Aug. 1990).

Zussman et al, "GaAs/$Al_xGa_{1-x}$As Quantum well Infra-Red Photodetectors with cutoff Wavelength $\lambda_c$=14.9 Um", Electronics Letters, vol. 27, No. 17, Aug 1991.

Unlu et al, "Wavelength Selective Optical Logic and Interconnects", IEEE Journal of Quantum Electronics. vol. 29, No. 2, Feb. 1993, pp. 411–425.

Gfeller, "Optical Multiplexing of Data Signals," IBM Technical Disclosure Bulletin, vol. 22 No. 1, Jun. 1979, pp. 345–346.

Balliet et al., "Optical Transmission System for Interconnecting Electronic Units", IBM Technical Disclosure Bulletin, vol. 26, No. 4, Sep. 1983.

ONE-TO-MANY SIMULTANEOUS AND RECONFIGURABLE OPTICAL TWO-DIMENSIONAL PLANE INTERCONNECTIONS USING MULTIPLE WAVELENGTH, VERTICAL CAVITY, SURFACE-EMITTING LASERS AND WAVELENGTH-DEPENDENT DETECTOR PLANES

TECHNICAL FIELD

The present invention relates generally to optical processing, switching, communicating, and interconnecting, and, more particularly, to optical switching and communicating between different two-dimensional optical planes.

BACKGROUND ART

Figure 1A:
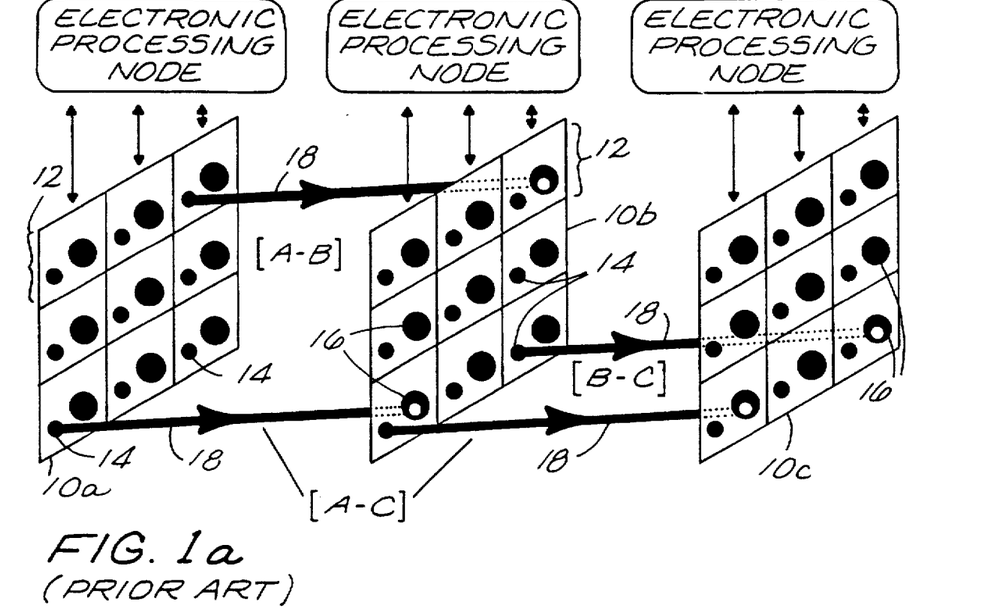
FIG. 1a is a schematic diagram in perspective, depicting a prior art scheme for optical interconnections between several planes, employing plane-to-plane communication in which a given plane must relay data by receiving it and then retransmitting it.

The ability to efficiently connect many high-speed ports is of critical importance for large-capacity data processing. By taking advantage of the parallel nature of light, two-dimensional (2-D) optical planes can be employed to avoid the eventual electronic bottlenecks of reduced speed and increased power consumption. However, a basic problem arises in the optical-plane solution when one plane wishes to communicate simultaneously or reconfigurably with many subsequent planes. Traditional optical systems solve this problem in two ways. The first approach is for each plane to detect a data packet and then, if it is not intended for that plane, retransmit it to the next plane; see, e.g., J. W. Goodman, "Optics as an Interconnect Technology", in *Optical Processing and Computing*, H. H. Arsenault et al, Eds., Academic Press, Inc., New York (1989). This configuration is depicted in FIG. 1a, discussed below. The disadvantages include the possibility of an electronic high-speed bottleneck as well as the wasting of capacity, real estate, and optical hardware.

Figure 1B:
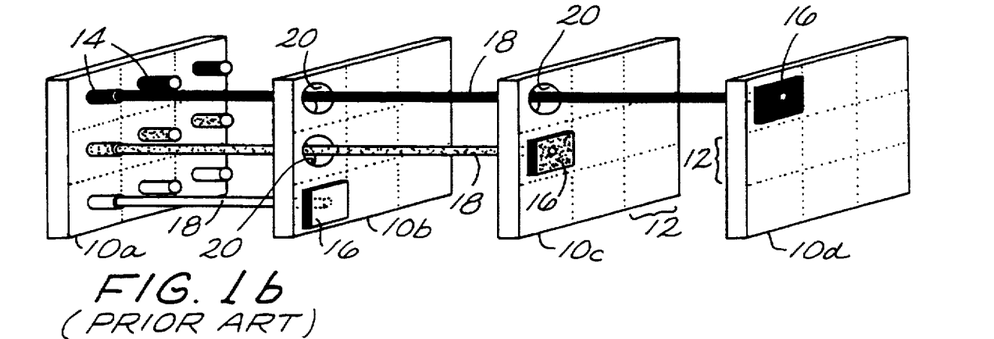
FIG. 1b is a schematic diagram in perspective, depicting another prior art scheme for optical interconnections between several planes, but employing via-hole windows which establish a permanent optical path.

The second approach involves etching large via-hole windows in each plane's substrate such that an unobstructed and permanent optical path is created between a transmitting pixel on plane i and a detecting pixel on plane j; see, e.g., A. Dickinson et al, "Free-space optical interconnection scheme", *Applied Optics*, Vol. 20, No. 14, pp. 2001-2005 (10 May 1990) and W. T. Cathey et al, "High concurrency data bus using arrays of optical emitters and detectors" *Applied Optics*, Vol.18, No.10, pp. 1687–1691 (15 May 1979). This configuration is depicted in FIG. 1b, also discussed below. This second approach solves the electronic bottleneck but wastes real estate and allows only a predetermined static connection between any two planes.

Thus, a need remains for efficiently coupling many high-speed optical ports from one plane to another such that reconfigurability and simultaneity can be accomplished without wasting real estate.

DISCLOSURE OF INVENTION

In accordance with the present invention, apparatus is provided for simultaneously and reconfigurably establishing optical communication channels from at least one light source to a plurality of wavelength-selective detectors optically associated with each light source, with the detectors stacked one behind another.

The apparatus of the present invention uses wave-length-division-multiplexing (WDM) to facilitate simultaneous and reconfigurable communication of one-to-many 2-D optical planes. This advance dramatically increases the system functionality of optical-plane interconnects. Such a system is realized by incorporating several multiple wavelength vertical-cavity surface-emitting lasers (VCSEL) into each transmitting pixel and incorporating wavelength selectivity into each subsequent detecting plane which will absorb one wavelength and be transparent to the rest; these structures can be fabricated by slightly modifying existing technology. This system allows for increased processing functionality of communicating both simultaneously and reconfigurably between many planes; broadcasting and dynamic independent interconnects are thus enabled. A high contrast ratio with low power penalty can be achieved for a channel wavelength separation,$\Delta\lambda, >30$ nm. Furthermore, by implementing WDM, system capacity is enhanced and real estate usage is more efficient. This WDM system can also be used for several $\lambda$-dependent layers inter-communicating in a multiple-level printed-circuit computer board.

BEST MODES FOR CARRYING OUT THE INVENTION

Turning now to the drawings wherein like numerals of reference depict like elements throughout, FIGS. 1a and 1b depict common prior art solutions to optical communication between several planes. In FIG. 1a, each plane 10 contains a plurality of pixels 12. The pixels on the first plane 10a are provided only with a light-emitting source 14, while the pixels on the last plane 10d are provided only with a detector 16. Each pixel on intermediate plane 10b is provided with both a light-emitting source 14 and a detector 16. Pixels on one plane 10 communicate with pixels on a subsequent plane through detection of light 18 emitted by a source 14 on an earlier plane, say, plane 10a, by a detector 16 on the next subsequent plane, say, plane 10b. Each plane detects a data packet and then, if the data was not intended for that plane, retransmits it to the next plane (denoted "plane-to-plane"). As an example, a pixel on plane 10a communicates with a detector on plane 10b, as denoted [A–B], while a pixel on plane 10b communicates with a detector on plane 10c, as denoted [B–C]. Communication between planes 10a and 10c requires detection on plane 10b and retransmittal, as denoted [A–C].

In FIG. 1b, via-hole windows 20 are provided on the intermediate planes in a prescribed pattern. The pixels on the first and last planes are provided with sources 14 and detectors 16, as in the scheme depicted in FIG. 1a. Selected pixels 12 on intermediate planes are provided with both sources 14 and 16, also as in the scheme depicted in FIG. 1a. Other pixels on the intermediate planes do not exist, due to the presence of the via-hole windows 20, which establish a permanent optical path. The large via windows 20 are etched in each plane's substrate so as to provide an unobstructed and permanent optical path between a transmitting plane on one side and a detecting plane on the other.

System Configuration:

In accordance with the present invention, apparatus is provided for simultaneously and reconfigurably establishing optical communication channels from a source to a plurality of wavelength-selective detectors, stacked one behind another.

In one embodiment, one two-dimensional (2-D) plane communicates simultaneously and reconfigurably with many planes, using wavelength division multiplexing (WDM). The apparatus of the invention incorporates arrays of multiple wavelength vertical-cavity surface-emitting lasers (VCSELs) as well as wavelength-selective detecting planes. VCSELs have been described by C. J. Chang-Hasnain et al, "Multiple Wavelength Tunable Surface-Emitting Laser Arrays", IEEE Journal of Quantum Electronics, Vol. 27, No. 6, pp. 1368–1376 (June 1991).

Figure 2:
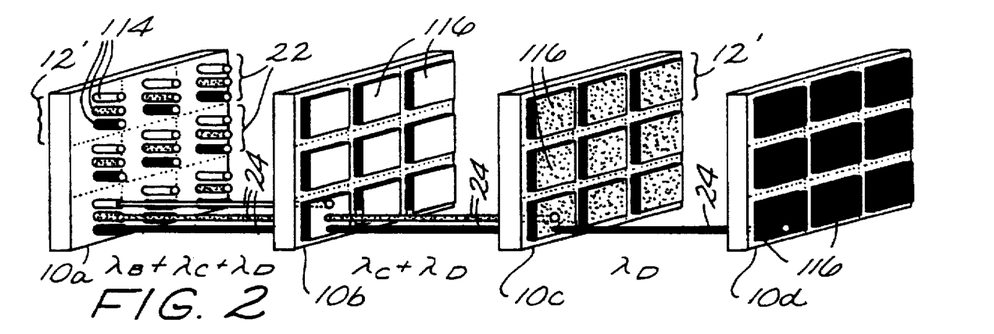
FIG. 2 is a schematic diagram in perspective, depicting a one-to-many optical plane interconnection configuration, designated (1T →MR), in accordance with the invention, using arrays of multiple wavelength, vertical-cavity, surface-emitting lasers (VCSELs) and multiple wavelength-selective detecting planes (three such lasers per array and three such detecting planes are shown)

FIG. 2 depicts the basic concepts for this WDM 2-D optical interconnect system in which, for simplicity in this embodiment, only one plane 10a is transmitting and several planes 10b–d are receiving, with a total of M planes (here, 4 planes 10). The transmitting plane 10a is composed of an N×N pixel array 12' with each pixel containing a miniature multiple wavelength VCSEL array 22. Each laser 114 in a pixel 12'emits light at a different wavelength, length, $\lambda$, and these wavelengths are advantageously equally spaced apart. There are (M−1) lasers 114 in each pixel 12', corresponding to the (M−1) other planes 10 which this pixel may wish to communicate with. This WDM pixel 12'is repeated identically for the entire N×N plane array.

As described above, the first plane 10a is a transmitting-only plane, and the subsequent planes 10b–d are detecting-only planes. As will be described with respect to another embodiment below, the intermediate planes 10b–c may also be provided with transmitting source arrays 22. Both embodiments are called herein a "unidirectional bus".

As is well-known, semiconductor lasers comprise an active, or light-emitting, region sandwiched between mirrors. In the chirped array structure disclosed by Chang-Hasnain et al, supra, spacer layers of increasing thickness are provided in both the x- and y-directions. Since the output wavelength of each laser is dependent on the thickness of the spacer layer, an array of multiple wavelengths is achieved.

In the practice of the present invention, the same principle may be utilized, except that each pixel has an identical array of lasers, with the array of lasers in each pixel having a sequence of spacer layer thickness that is replicated from one pixel to the next, thus providing a repeated chirped array.

Each of the (M−1) detector planes 10b–d has $N^2$ pixels 12", each of which contains a p-i-n detector 116 with its spectral response slightly offset from one plane to the next in its wavelength-dependent detectivity. The detector planes 10b–d are configured such that the cutoff wavelength increases for each subsequent plane. Each detecting plane 10b–d will detect only the shortest-$\lambda$signal remaining in the beam 24 and will be transparent to all the longer wavelength signals. As an example, for (M−1)=3 and $\lambda_1<\lambda_2<\lambda_3$, detector plane 10b will absorb $\lambda_1$ only and be transparent to $\lambda_2$ and $\lambda_3$, detector plane 10c will absorb $\lambda_2$only and be transparent to $\lambda_3$, the final plane 10d will absorb $\lambda_3$. Thus, communication can be accomplished from one transmitting plane 10a to many detecting planes 10b–d in a dynamic and reconfigurable manner simply by switching "ON" the single appropriate laser 114 in the $\{\lambda_1,\lambda_2,\lambda_3\}$ VCSEL array The intricacies of steering the light emitted from a particular laser on one plane to land on a particular detector on a subsequent plane involves a variety of issues to be considered, including geometrical, defocussing, focussing, and steering aspects. For example, a backside-fabricated collimating lens (not shown) may be employed to collimate light emerging from the substrate of plane 10a Two other configurations exist. First, broadcasting simultaneously to many planes 10b–d from this WDM pixel 12'can be accomplished by turning "ON" many lasers 114 simultaneously which can transmit the same bit stream to many planes. Second, if enough control electronics is included in each transmitting pixel 12'then each laser 114 can be independently biased and one pixel 12'can even communicate different, independent information to many planes 10b–d simultaneously.

The fabrication of WDM pixels and λ-selective detectors can be achieved with slight alteration of existing technology. By fabricating a thickness gradient in the spacer layer of the VCSEL structure, as described above, a series of lasers 114 can be made to emit distinct, equally-spaced wavelengths. Such a gradient is made periodic across the wafer to produce identical WDM pixels 12'. Furthermore, the λ-selectivity of the detector planes 10b–d can be tailored over a wide wavelength range by varying the material composition of the detector absorption layer. For example, employing (Al, Ga)As detectors 116 on GaAs substrates 10b–d permits variation in the aluminum content relative to gallium. The GaAs substrates are transparent at all frequencies of the VCSEL array 22. However, changing the Al concentration in the detectors causes a change in the bandgap and hence a change in energy at which a photon emitted by the source 114 is detected. Detection occurs if the energy of the photon exceeds the bandgap energy (i.e., if the wavelength of the photon is short enough); otherwise, the detector 116 is transparent to the photon.

In addition to the foregoing, because the pixel area is overwhelmingly dominated by the necessary laser and receiver electronics and not by the relatively small VCSEL array, adding more lasers does not alter the pixel density on a chip.

Additionally, a potential problem from an arrangement in which all planes are transmitting and receiving is that some stray light from the lasers will be coupled into the laser cavities on other planes. While this stray light may change some of the laser characteristics, it is expected that the overall performance will not be significantly degraded, since these VCSELs will be spaced apart by several nanometers and be operated well below their expected multi-GHz bandwidth.

Figure 3A:
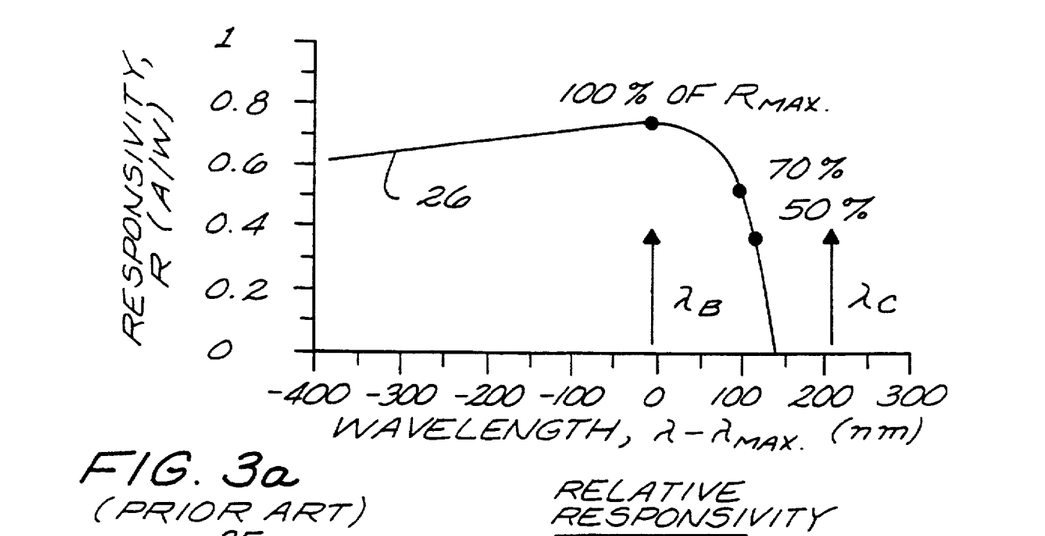
FIG. 3a, on coordinates of responsivity R (in A/W) and wavelength $\lambda-\lambda_{max}$ (in nm), is a plot of typical responsivity versus incident wavelength curve for an InGaAs detector.
Figure 3B:
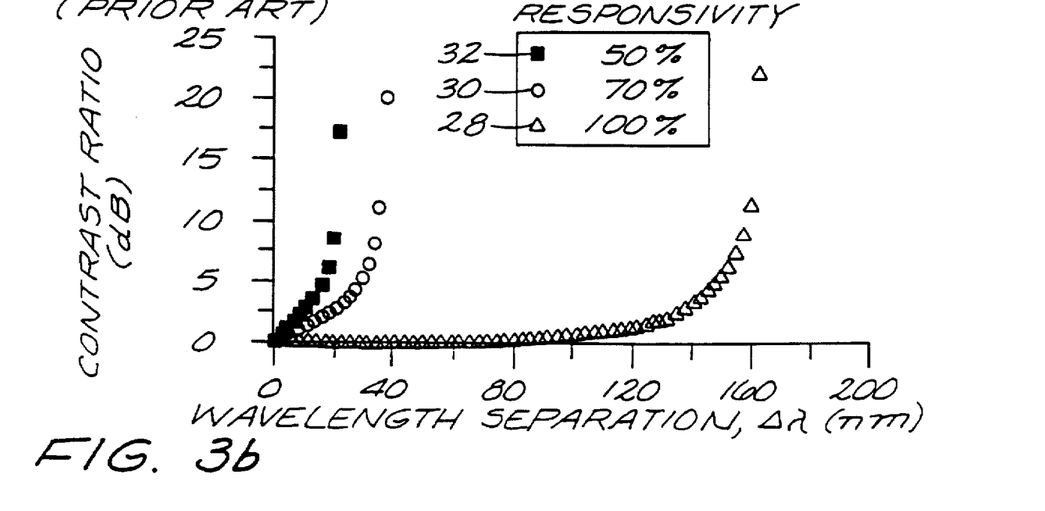
FIG. 3b, on coordinates of contrast ratio (in dB) and wavelength separation $\Delta\lambda$ (in nm), is a plot of the contrast ratio between a selected and rejected wavelength versus their wavelength separation (curves represent different selected-channel responsivities in relation to the responsivity maximum, such that [$\lambda_{select} > \lambda_{max}$])

Key performance parameters include the achievable contrast ratio and power penalty when a given plane absorbs one shorter wavelength signal and rejects other longer wavelength signals. All wavelengths are placed on the long wavelength edge of a typical response curve (Curve 26) of an InGaAs detector, as shown in FIG. 3a. Although the responsivity maximum for this detector is near 1600 nm, this is considered to be a non-specific wavelength, which enables analysis of a generic system. FIG. 3(b) plots the contrast ratio versus wavelength separation, $\Delta\lambda$, between a signal intended to be absorbed and a single rejected wavelength intended to be unaffected and passed. The contrast ratio is computed for different selected-signal wavelengths in comparison to the wavelength at which the responsivity curve is a maximum such that $(\lambda_{select} > \lambda_{max})$; this is depicted as the percent of the responsivity at the selected wavelength in comparison to the responsivity maximum. If the wavelength producing maximum responsivity (100%) is chosen for the selected signal, then a larger $\Delta\lambda$ is required to avoid absorption of the rejected signal (Curve 28). Furthermore, a $\Delta\lambda > 40$ nm for the 70%-of-maximum case (Curve 30) and a $\Delta\lambda > 20$ nm for the 50%-of-maximum case (Curve 32) will provide a contrast ratio >20 dB.

It will be appreciated that the steeper the roll-off of the detector at long wavelengths, then the closer together the different signal wavelengths can be. Steepening the detector roll-off can be accomplished by using quantum well detectors in place of the bulk detectors described above.

Figure 4A:
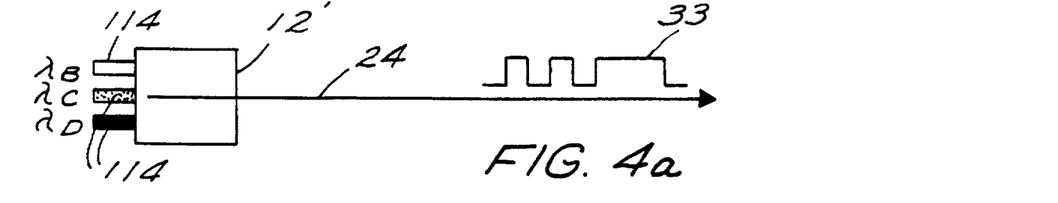
FIGS. 4a–c depict system scenarios for either the first plane transmits or all intermediate planes transmit, showing the individual mode (FIG. 4a) in which one laser is "ON" individually (reconfigurably), the broadcast mode (FIG. 4b) in which all lasers are "ON" simultaneously with the same data, and the independent mode (FIG. 4c) in which all lasers are "ON" simultaneously with different data.
Figure 4B:
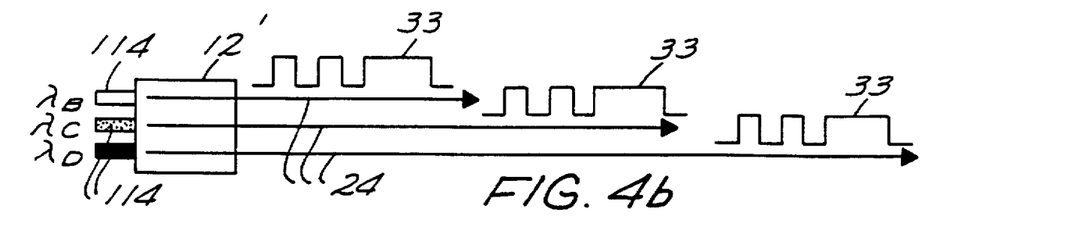
Figure 4C:
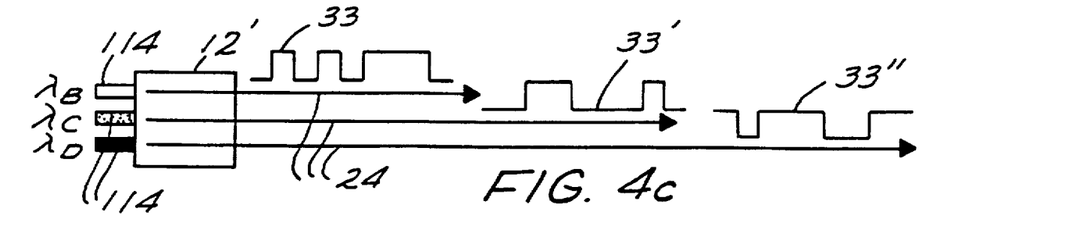

The total system capacity of the WDM configuration (FIG. 2) is now analyzed as compared with the prior art plane-to-plane system (FIG. 1a) and via system (FIG. 1b). The two basic scenarios include (a) one plane boa transmits and the rest of the planes 10b–d either receive or relay information, denoted as (1T→MR), and (b) all intermediate planes 10b–c can transmit their own data as well as receive, denoted as (MT→MR); it will be noted that (MT→MR) would require each pixel to contain both a laser 14, 114 and a detector 16, 116. Furthermore, three variations of the WDM pixel for both (1T→MR) and (M→MR) categories are examined: (i) individual mode —the (M−1) lasers can only be turned reconfigurably "ON"one at a time from the same driver, (ii) broadcast mode —the (M−1) lasers can all be turned "ON" simultaneously with the same data from a single driver, and (iii) independent mode —the (M−1) lasers can be turned "ON" simultaneously and independently, transmitting different data streams to different planes and requiring (M−1) laser-driver electronics. FIGS. 4a–c depict the system scenarios for the three modes, respectively, illustrating packets of information 33 carried on beams 24. The different configurations may be summarized as:

(1T→MR) & (MT→MR)
  A) Plane-to-Plane (prior art)
  B) Via Windows (prior art)
  C) WDM Pixels (this invention)
   (i) Individual Mode—one laser "ON" singularly;
   (ii) Broadcast Mode—all lasers "ON" simultaneously with same data;
   (iii) Independent Mode—all lasers "ON" simultaneously with independent data.

Figure 5A:
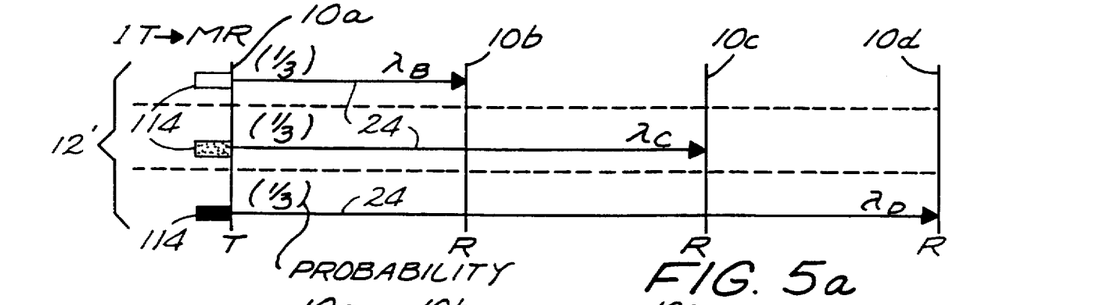
FIGS. 5a–b depict all possible channels for each pixel in a 4-plane WDM system for one plane transmitting to many planes, designated (1T→MR), (FIG. 5a) and for intermediate planes transmitting to many planes, designated (MT→MR), (FIG. 5b), given only one pixel is "ON" per pixel, with each channel (arrow) designated with a probability of occurring and on which wavelength it is established and with T and R denoting the ability for a plane to transmit and received respectively.
Figure 5B:
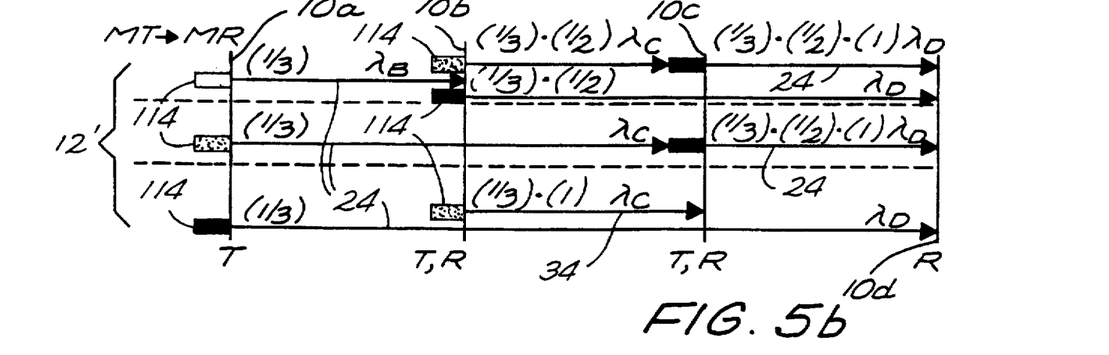

The algorithm for deducing the maximum total system capacity in M planes ($C_M$) involves finding the total number of allowable channels transmitting new (not relayed) information for a given configuration. Furthermore, the broadcasting from M lasers in a pixel to M different planes establishes M different channels, assuming non-interfering channels. If all planes can receive information as well as transmit their own information (MT→MR), then it is assumed that each laser and receiver has a bit-rate of r. Now allow the first plane to transmit with equal probability to any available subsequent planes. The next plane can then utilize with equal probability the remaining idle detectors on its subsequent planes to transmit its own information and communicate with a detector that does not already have an established channel. A laser can transmit to only one detector, and a detector can receive data from only one laser. FIGS. 5a–b depict the two individual-mode WDM scenarios [(1T→MR), (MT→MR)] and the probability for each channel being established.

1T→MR: For only the first plane transmitting, $C_M$ for the plane-to-plane, via, and individual-mode WDM cases is $(rN^2)$; plane-to-plane and via systems have identical capacities, since the act of relaying information with a detector/laser pair or with a via does not add new data. It must be emphasized that in the WDM individual mode, the system is dynamically reconfigurable even though the capacity is not enhanced. For the broadcast and independent WDM modes in which all the lasers can be "ON" simultaneously, $C_M=((M-1)rN^2)$ and increases by the number of lasers in each pixel. Thus, the capacity for these last two cases represents a significant advance by allowing all planes to simultaneously communicate with all planes.

MT→MR: For all intermediate planes transmitting, the capacity is analyzed by using combinatorial methods and the probabilities for all allowable channels. For the plane-to-plane and via cases, $C_M$ is determined by the average number of allowable channels, and is given by $$C_M = rDN^2/(M-1), \quad (1)$$

$$D = 1 + \sum_{j=0}^{(M-3)} \left\{ 2 + (1/2^j) \left( \sum_{i=0}^{j} i(j!/(i!(j-i)!)) \right) \right\}$$

where D represents the average number of channels established given that plane j communicates with plane M−(j+1). For example, if M=3, then plane A can either communicate with plane B or plane C. If plane A communicates with plane B, then plane B can also communicate with plane C, thus establishing 2 links. If plane A communicates with plane C, then plane B lies dormant and only 1 link is established. On average, 1.5 links exist. At the other extreme, the WDM cases in which all the lasers can be "ON" simultaneously have $C_M=(M-1)rN^2$ which is their same ultimate capacity as in the (1T→MR) category.

Figure 6:
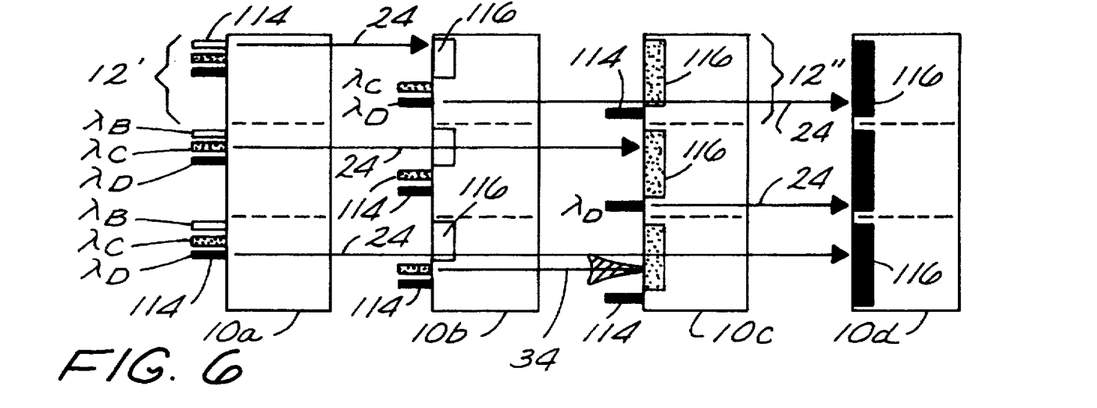
FIG. 6 is a schematic diagram, similar in view to those depicted in FIGS. 1a–b, but depicting an alternate embodiment of the invention, in which all intermediate planes have the ability to transmit, designated (MT→MR) and given only one laser is "ON" per pixel.

The most interesting case is the WDM system with only a singular laser "ON" for (MT→MR), providing a significant capacity enhancement (see FIG. 6). As opposed to using vias, the WDM pixel can establish an additional communications channel 34 between itself (B) and another plane (C) even if it is concurrently relaying data between another two planes (A,D) by being transparent to that other signal. Thus, inner planes can communicate independent of outer planes.

Figure 7A:
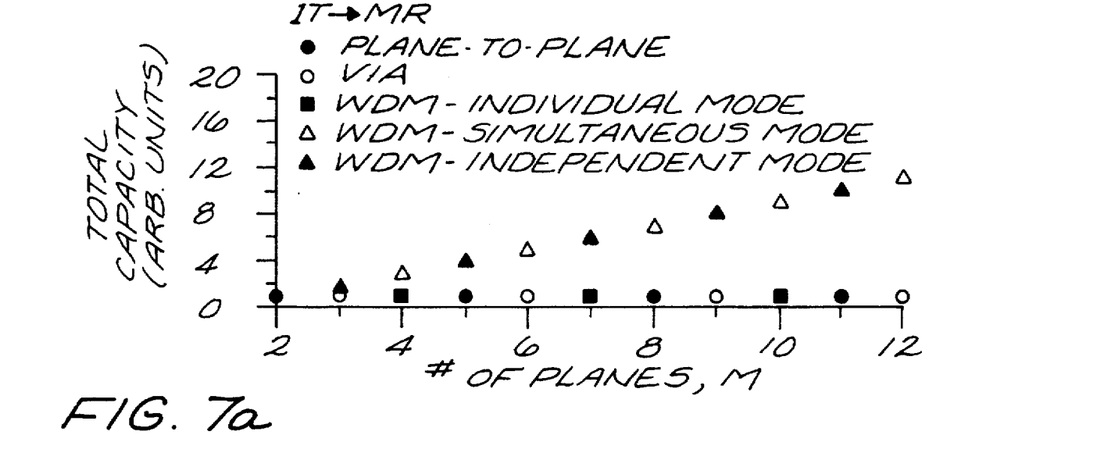
FIGS. 7a–b, on coordinates of total capacity (in arbitrary units) and number of planes M, is a plot depicting total system capacity versus number of optical planes for only the first plane transmitting (1T→MR) (FIG. 7a) and for all planes with the ability to transmit (MT →MR) (FIG. 7b)
Figure 7B:
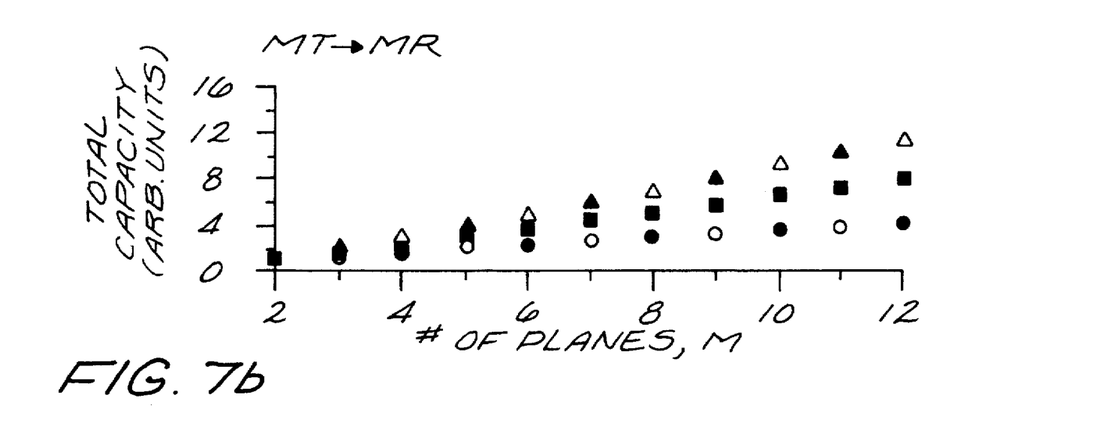

For this case, $C_M$ has been solved both by computer simulation, which counts the possible established channels, and by combinatorial analysis. The analytical solution involves a "cost function" which describes the capacity lost due to certain inter-plane connections, as illustrated by considering a 3-plane system. If plane A communicates with plane B and B with C, then 2 channels have been established. However, if plane A wishes to communicate with C, then B will not receive any data. Therefore, connecting A-to-C has a 50% probability of occurring but "costs" (reduces) some capacity. Furthermore, recursive relations also exist since an M-plane system can be described by first considering the solutions to a combination of smaller (M−1) or (M−2) units. Consequently, the upper ($C_{U,M}$) and lower ($C_{L,M}$) total-capacity bounds are $$C_{U,M} = ((C_{U,M-1}+1)/(M-1)) + ((M-2)/(M-1))B_{M-1}, \quad (2)$$

$$B_M = ((B_{M-1}+C_{U,M-2})/2) + 1$$

$$C_{L,M} = (C_{L,M-1}/(M-1)) + ((M-3)/(M-1))C_{L,M-2} + Q_{M-2}/(M-1)+1, \quad (3)$$

$$Q_M = (Q_{M-1}/(M-1)) + ((M-2)/(M-1))C_{L,M-1}+1$$

in which $C_{U,2}=C_{L,2}=1$, $C_{U,3}=C_{L,3}=1.5$, $B_2=Q_2=1$, and $B_3=Q_3=2$. $C_U$ and $C_L$ must be multiplied by $rN^2$ for normalization. The computer simulation falls a mere 5% above and below the lower and upper bounds, respectively, for an 11-plane system. $C_M$ is plotted FIGS. 7a–b for all the above cases except for 2 and 3. For 10 planess WDM even with only one laser individually "ON" per pixel essentially doubles the capacity of the via-hole solution while providing reconfigurability. Thus, the present invention provides capacity enhancement of optical communication between planes.

It will be noted that in comparing the plots of FIGS. 7a and 7b, the WDM reconfigurable situation in the case of only the first plane transmitting (1T→MR) results in essentially no increase in capacity as the number of planes increases. However, in the case of all intermediate planes transmitting (MT→MR), the more planes present, the more capacity.

With regard to capacity enhancement, it should be noted that with the prior art via system, 10 planes would require 80% of the planar area just to provide the requisite number of vias for fully connected plane-to-plane communication. Twenty planes would require 90% of the planar area. Such an extensive dedication of the planar area, of course, renders the via scheme useless as a practical method for simultaneous optical interconnection involving many planes.

Figure 8A:
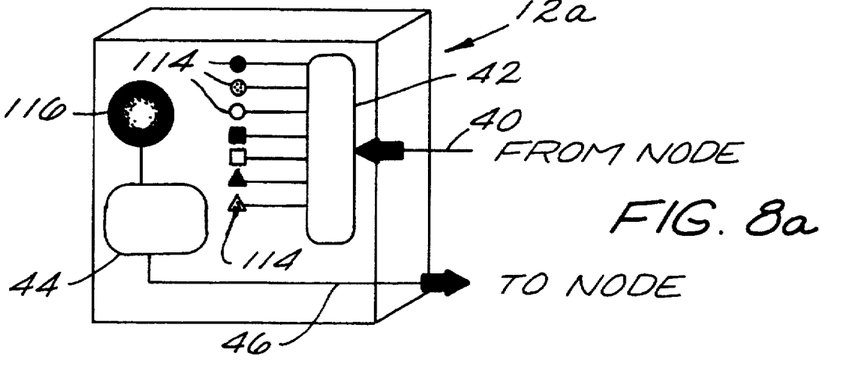
FIGS. 8a–c depict different pixel configurations that may be employed in the practice of the invention, including individual mode (FIG. 8a), broadcast mode (FIG. 8b), and independent mode (FIG. 8c)
Figure 8B:
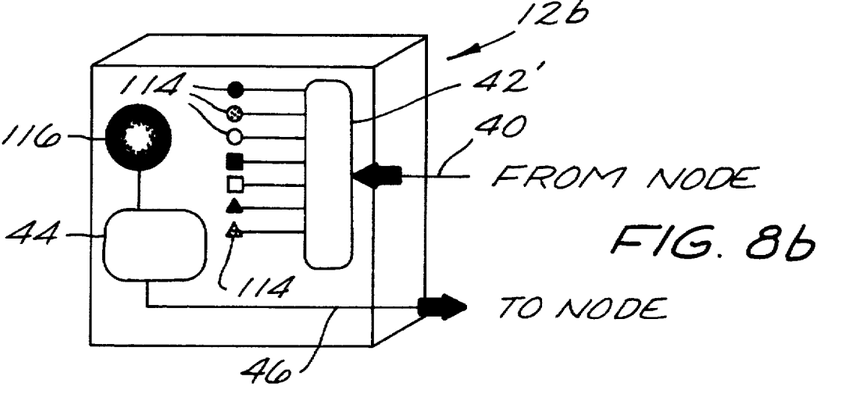
Figure 8C:
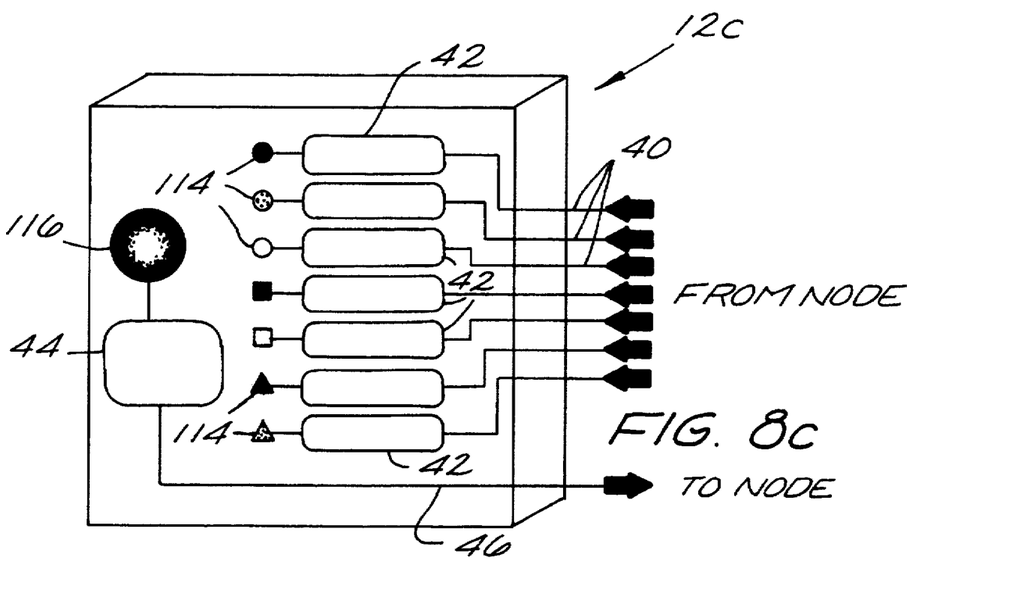

Additional Embodiments:

As indicated above, the pixels employed in the practice of the present invention may be employed in a variety of configurations: individual mode 12a, broadcast mode 12b, and independent mode 12c. These various configurations are depicted in FIGS. 8a–c, respectively, and are used in connection with the data transmitted in FIGS. 4a–c, respectively. Connection is made from and to a network node (not shown). The connection from the network node, denoted 40, provides a signal to driver electronics 42, which drives the VCSEL lasers 114. The detector 116 is connected to receiver, or detector, electronics 44, which outputs a signal to the connection to the network node, denoted 46. The driver electronics 42 and receiver electronics 44 are conventional and thus are not shown in detail. It is evident from these drawings, although not entirely to scale, that the driver electronics 42 and receiver electronics 44 take up substantially more "real estate" than do the VCSEL lasers 114 and detector 116, as indicated above. Thus, the total pixel area does not depend on the number of VCSEL lasers in a given pixel.

It will be noted that FIGS. 8a and 8b are nearly identical. The only difference is that the driver electronics 42' of FIG. 8b must be of higher power than the driver electronics of FIG. 8a in order to drive all lasers 114 simultaneously.

Figure 9:
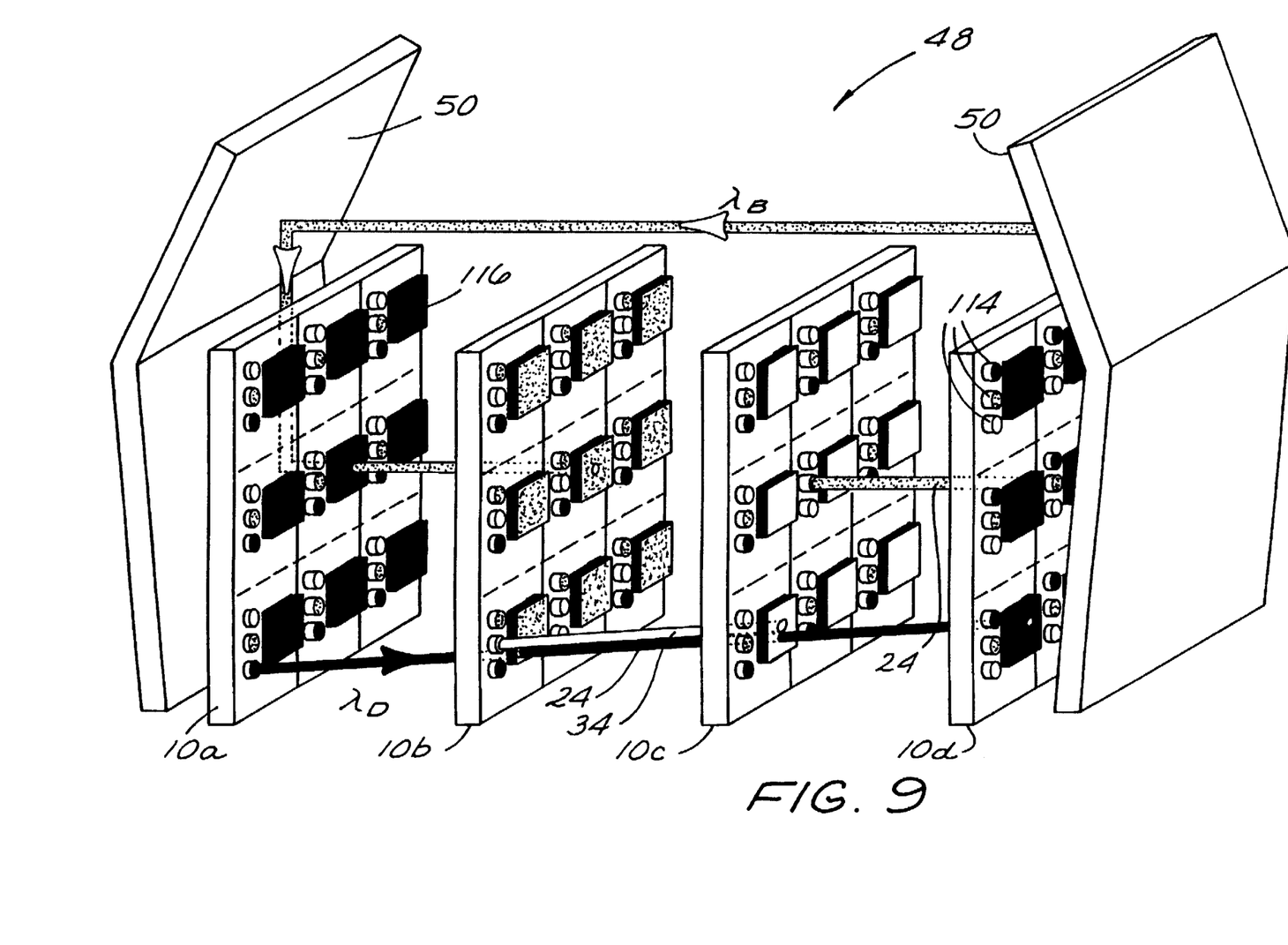
FIG. 9 depicts yet another embodiment of the present invention, employing mirrors to form a unidirectional ring for coupling optical information from the last plane back to the first plane or from any plane back to a previous plane.

A unidirectional ring 48 can be used to couple the output from the last plane 10d to the first plane 10a using mirrors 50, as shown in FIG. 9. The first plane 10a is provided with detectors 116, in addition to source laser arrays 114 while the last plane 10d is provided with source laser arrays 114, in addition to detectors 116. Detectors 116 in the last plane 10d absorb all the remaining light and cause a laser source 114 to transmit the information to the mirror array, which then returns the transmission to the first plane 10a or other plane in the bus. Selection of the appropriate laser 114 enables use of a particular wavelength to permit plane 10d to communicate with any of earlier planes 10a,10b,and/or 10c, as described above.

In the ring concept described with reference to FIG. 9, it will be appreciated that the use of detectors passing wavelengths above a given value and absorbing other wavelengths below that value essentially renders those detector planes as low pass detectors having a low pass response in wavelength. That is to say, as described so far, the planes themselves are not bandpass detectors having a bandpass response. If, however, the detector planes could be made as bandpass detectors having a bandpass response, then the retransmit concept for plane 10d would not be required. Rather, only an appropriate optical filter would be needed with the detectors on plane 10d.

Figure 10:
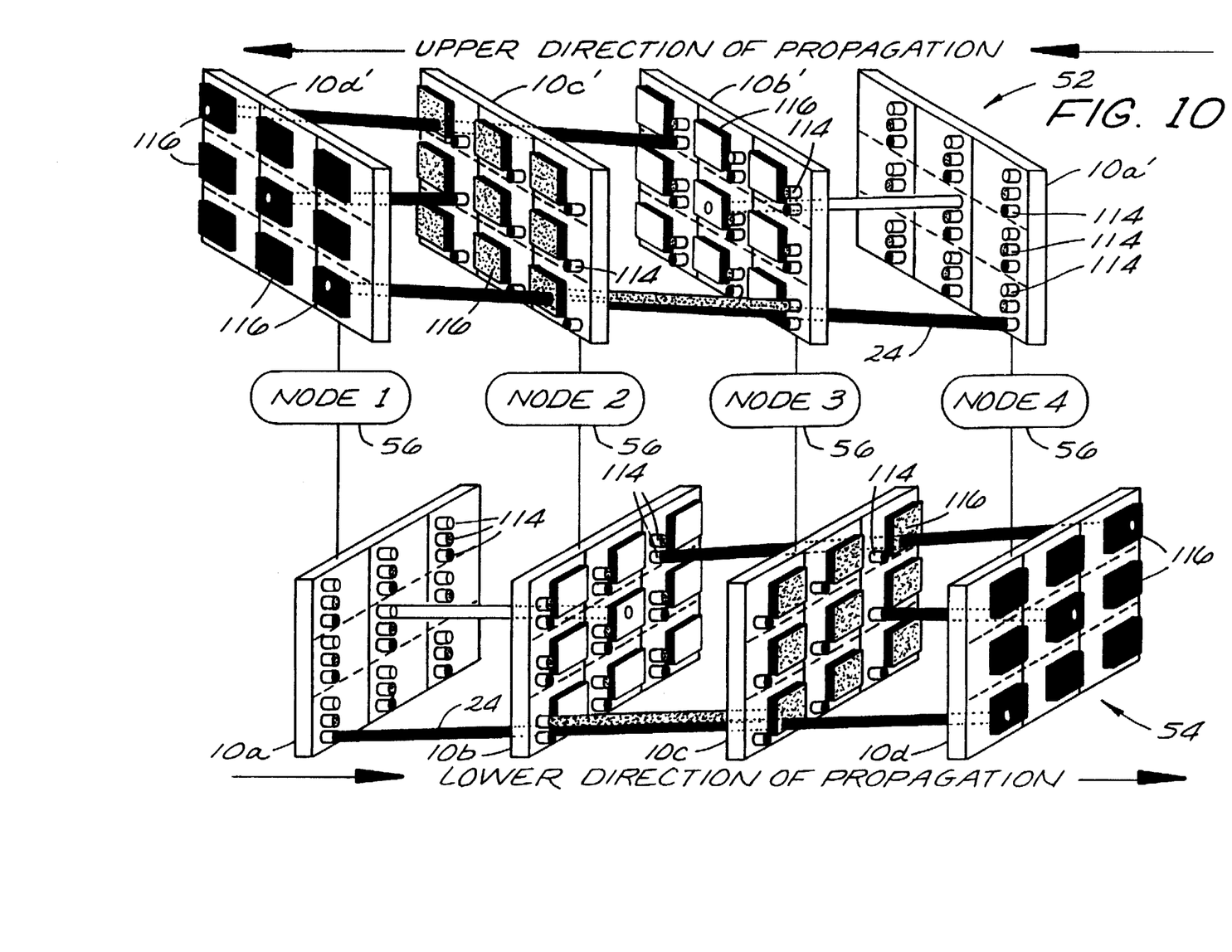
FIG. 10 depicts an alternative embodiment of the present invention, showing a dual bus configuration.

An alternate embodiment of the invention is depicted in FIG. 10, called the "dual bus" (the basic embodiment described above is termed the unidirectional bus). In this configuration, two planar configurations 52 and 54, one a mirror image of the other, are provided, with propagation going in opposite directions. Here, node 56-2 cannot communicate with node 56-4 through the upper planar configuration 52, but it can in the lower planar configuration 54. (The nodes of an optical communication network may be configured in a variety of ways. A node in this system is a high speed transmitter or receiver of data, as in a node within a network.) Thus, the dual bus is similar in result to the ring configuration 48 shown in FIG. 9. Switching is performed to route communication from the upper configuration 52 to the lower 54 and visa versa, as required, through the nodes 56.

Figure 11:
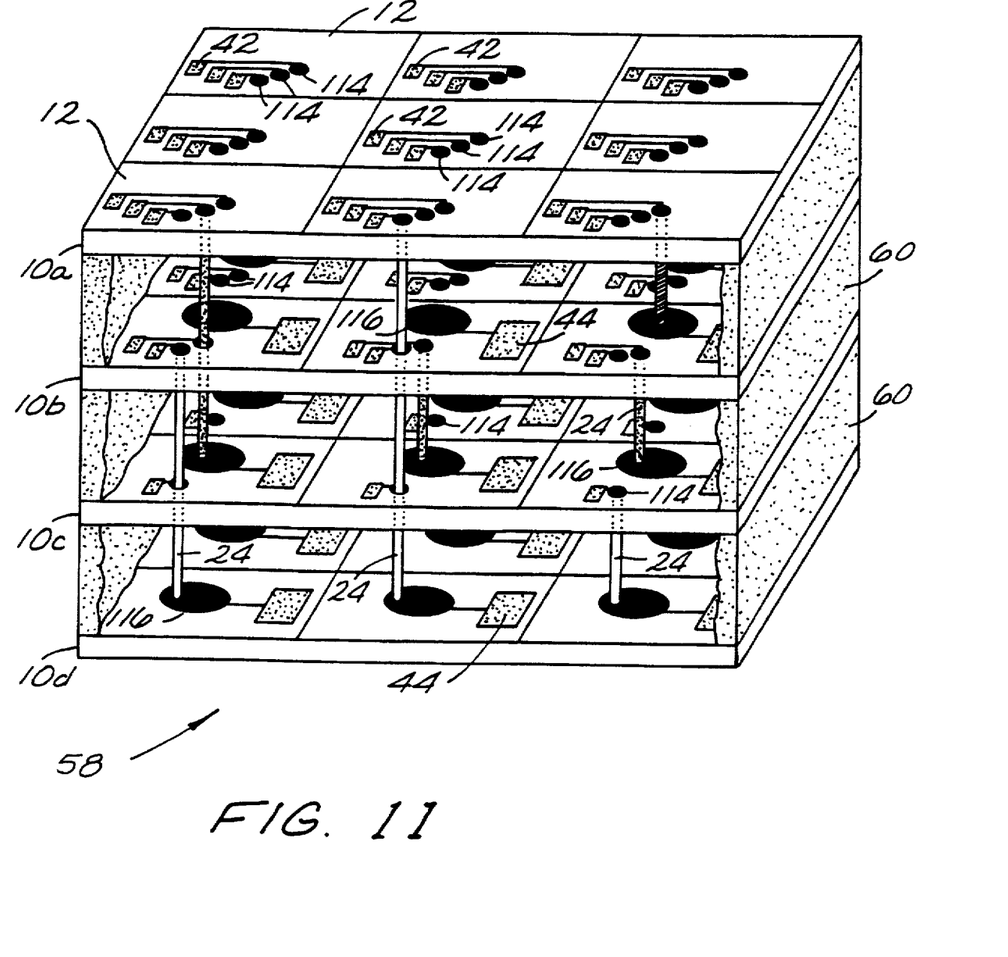
FIG. 11 illustrates a practical implementation of the teachings of the invention, depicting a printed-circuit computer board employing a multi-layer interconnection module.

FIG. 11 depicts a multi-layer interconnection module 58 for use on a printed-circuit computer board in a practical implementation of the teachings of the present invention. The computer board illustrated has the same general configuration as the unidirectional bus described earlier.

As an example, the individual planes 10a–d comprise GaAs, which as noted above, is transparent to the laser frequencies. The source arrays 114 and detectors 116 are as described above, as are the driver electronics 42 and detector electronics 44. The detectors comprise $Ga_xAl_{1-x}As$, where the value of x is varied in each source array to provide wavelength selectivity. The direction of propagation is from plane 10a to plane 10d. The individual planes are separated by silicon layers 60, which provide mechanical support and separation of layers. Anti-reflection coatings (not shown) may be deposited on the various layers to prevent backscattering of light.

InP or Si may alternatively be employed as the material for the planes 10. The detectors 116 may alternatively comprise $In_xGa_{1-x}As$ or $In_xGa_1As_yP_{1-y}$, where x and y each independently range from 0 to 1.

The configuration depicted in FIG. 11 is especially useful in parallel processing, in which each layer 10 is performing processing functions and can broadcast results to subsequent planes 10.

Figures 12A, 12B:
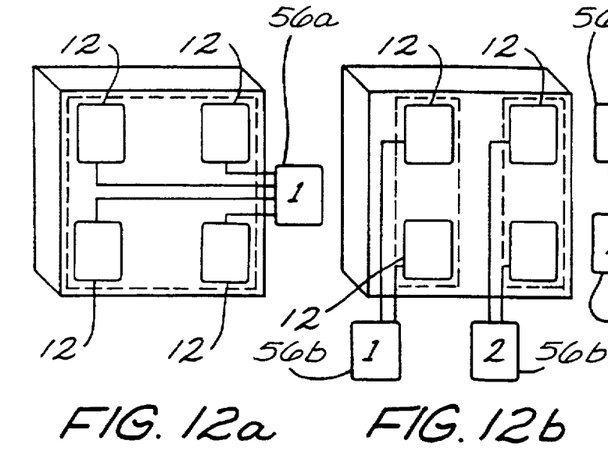
FIGS. 12a–c depict various node configurations for a pixel array (shown here is a 2×2 array), including plane node (FIG. 12a), column (or row) node (FIG. 12b), and pixel node (FIG. 12c)
Figure 12C:
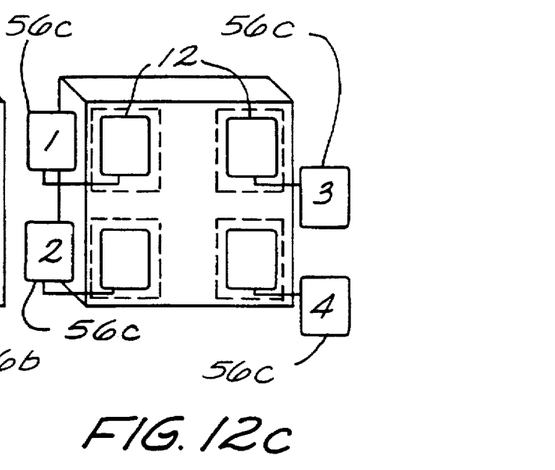

Reduced Network Delay Using WDM:

FIGS. 12a–c depict three configurations for a 2×2 pixel array. The node 56 associated with the node on the plane is shown in each case as that area encompassed by dashed lines. FIG. 12a depicts a planar node 56a, which encompasses all four pixels 12 in the array. FIG. 12b depicts two column nodes 56b, each encompassing two pixels 12. The equivalent case is two row nodes (not shown), orthogonal to the column nodes 56b. In the final configuration, shown in FIG. 12c, each pixel 12 is a node 56c.

The significance of node configurations rests on the concept of the number of hops required for interplanar communication. As used herein, the number of hops refers to the number of times a particular signal must be transmitted by a plane to a destination plane (or detected by a plane and retransmitted by that plane to a subsequent plane). As will be appreciated from the discussion above, with four planes and three wavelengths, only one hop is required to go from the first plane to the last plane. In the ring structure depicted in FIG. 9, one additional hop is required, from the last plane to the mirror, because all possible wavelengths are absorbed by the last plane and then subsequently retransmitted, thus requiring the additional hop.

Figure 13A:
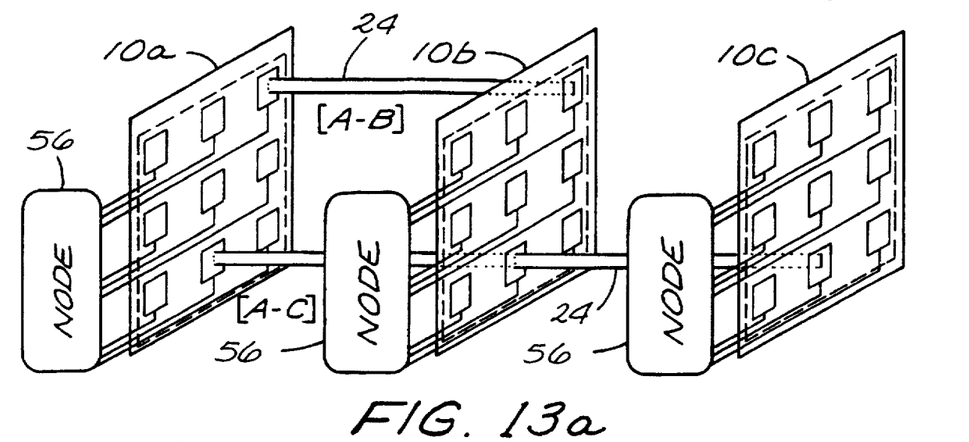
FIGS. 13a–b depict reduced network delay employing WDM, showing plane-to-plane node communication (FIG. 13a) and row-to-column (or row) node communication (FIG. 13b).

Turning now to systems employing many planes, and considering the situation in which the entire plane 10 is the node 56, if there are 19 wavelengths and 20 planes, then only one hop is required. Interestingly, if there are only two wavelengths and 20 planes 10, then, on average, only three hops are required to transmit information from a source plane to a destination plane. The planar node communication configuration is depicted in FIG. 13a.

Figure 13B:
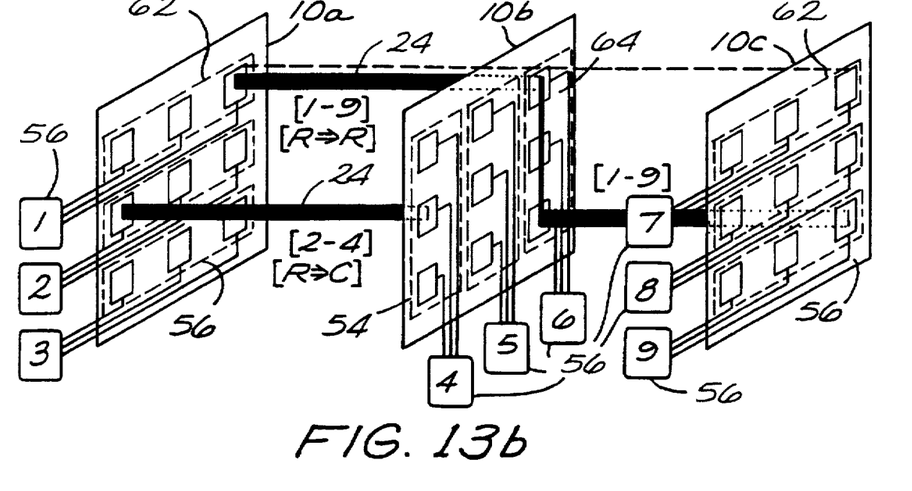

Considering now the situation in which alternating rows 62 (on every other plane 10) and columns 64 (on inbetween planes) are employed as the nodes 56, then a single row node can communicate with all column nodes on the adjacent plane, since a source node (column) can turn on any one of a number of pixels which can separately access different rows on a subsequent plane. A single row node can also communicate with all column nodes on the any subsequent plane if the intermediate planes are all transparent to the wavelength transmitted. Thus, any row node can communicate with a subsequent column node in one hop if the intermediate planes are all transparent. However, a single row node on a particular plane can only communicate with a single row node on a subsequent plane at the same corresponding spatial location (assuming that the intermediate planes are transparent). In order for a single row node 56-1 to communicate with a row node 56-9 at a different spatial location on that subsequent plane, a retransmittal of the data is required, thus necessitating two hops. It can be shown that even for a large number of planes, if there is a sufficient number of wavelengths, then only two hops are required at most for row-to-row node communication. Reducing the number of hops results in a reduced network delay, and hence improved speed in communication. The row-column communication configuration is depicted in FIG. 13b. It will be appreciated that the row-column configuration provides both wavelength division multiplexing and space division multiplexing, thereby reducing network delays that may arise with other configurations.

In summary, a novel optical interconnect configuration is disclosed in which one 2-D plane can communicate simultaneously and reconfigurably with many planes by using WDM. Multiple wavelength laser arrays and wavelength-selective detectors are used to provide high contrast ratio, increased system capacity, and efficient real-estate usage.

Thus, there has been disclosed an optical interconnect configuration in which one 2-D plane can communicate simultaneously and reconfigurably with many planes by using wavelength division multiplexing. It will be readily apparent to those skilled in this art that various changes and modifications of an obvious nature may be made, and all such changes and modifications are considered to fall within the scope of the present invention, as defined by the appended claims.

What is claimed is:

1. Optical communication apparatus for simultaneously and reconfigurably establishing optical communication channels, comprising a plurality of light sources and a plurality of wavelength-selective detectors optically associated with said plurality light sources, wherein each of said light sources emits at a different wavelength and each of said wavelength-selective detectors has a different spectral response, said plurality of wavelength-selective detectors arranged one behind another such that each subsequent wavelength-selective detector will absorb and detect the shortest wavelength and be transparent to other longer wavelengths.

2. The optical communication apparatus of claim 1 comprising a plurality of pixels, each pixel including an identical source array, each array comprising a plurality of said light sources, each light source operating at a different wavelength, and each array optically associated with a said plurality of wavelength-selective detectors.

3. The optical communication apparatus of claim 2 comprising:

(a) at least one two-dimensional transmitting plane, each transmitting plane provided with a plurality of pixels, each pixel comprising a said identical source array; and (b) at least two two-dimensional detector planes, each detector plane behind another and all detector planes behind said at least one transmitting plane, each detector plane provided with a plurality of said wavelength-selective detectors, each detector on each of said two-dimensional detector planes associated with a given pixel on a previous said two-dimensional transmitting plane and having a cut-off in wavelength detection that increases in wavelength for detector planes further away from said transmitting plane.

4. The optical communication apparatus of claim 3 comprising a single said two-dimensional transmitting plane and at least two said two-dimensional detector planes.

5. The optical communication apparatus of claim 3 comprising a first said two-dimensional transmitting plane, a last said two-dimensional detector plane, and at least one two-dimensional plane intermediate therebetween comprising a combination of a said transmitting plane and a said detector plane, with each said pixel on said at least one intermediate plane comprising both one said identical source array and one said detector.

6. The optical communication apparatus of claim 5 wherein said first two-dimensional transmitting plane and said last two-dimensional detector plane each comprise a combination of a said transmitting plane and a said detector plane, wherein said apparatus is provided with a sequence of reflecting surfaces to transmit light emitted by a said light source on said last two-dimensional detector plane to a detector on any of said first two-dimensional plane and intermediate planes, and wherein a detector in a given pixel on said last two-dimensional detector plane is adapted to energize at least one light source of said source array in said given pixel.

7. The optical communication apparatus of claim 5 comprising:
(a) a first bus comprising
  (1) said first two-dimensional transmitting plane,
  (2) said last two-dimensional detector plane, and
  (3) said at least one two-dimensional plane intermediate therebetween comprising a plurality of pixels, each said pixel comprising both said identical source array and said detector;
(b) a second bus comprising
  (1) said first two-dimensional transmitting plane,
  (2) said last two-dimensional detector plane, and
  (3) said at least one two-dimensional plane intermediate therebetween comprising a plurality of pixels, each said pixel comprising both said identical source array and said detector;
(c) said first bus having a direction of propagation opposite in direction to that of said second bus; and
(d) a plurality of switching network nodes, each said node connecting a plane of said first bus with a plane of said second bus such that said first transmitting plane of said first bus is connected through a said node to said last detector plane of said second bus, said first transmitting plane of said second bus is connected through a said node to said last detector plane of said first bus, and all intermediate planes are connected to each other through a single node or a plurality of nodes, so as to permit any light source on a plane of one bus to access a detector on any plane of that bus or on any plane of the other bus.

8. The optical communicating apparatus of claim 2 wherein each said identical source array comprises a plurality of vertical-cavity surface-emitting lasers, each laser emitting at a different wavelength from the others in that array.

9. The optical communicating apparatus of claim 2 wherein only one light source in a said source array is turned "ON" at a time by a common driver.

10. The optical communicating apparatus of claim 9 wherein each said pixel comprises (a) said source array, (b) said common driver electrically associated with each said light source in said source array and adapted to receive an input signal from a network node, (c) said detector, and (d) receiver electronics for outputting a signal from said detector to a network node.

11. The optical communicating apparatus of claim 2 wherein all light sources in a said source array are turned "ON" simultaneously by a common driver and all said light sources transmit the same data.

12. The optical communicating apparatus of claim 11 wherein each said pixel comprises (a) said source array, (b) said common driver electrically associated with each said light source in said source array and adapted to receive an input signal from a network node, (c) said detector, and (d) receiver electronics for outputting a signal from said detector to a network node.

13. The optical communicating apparatus of claim 2 wherein all light sources in a said source array are turned "ON" simultaneously by separate drivers and all said light sources transmit different data.

14. The optical communicating apparatus of claim 13 wherein each said pixel comprises (a) said source array, (b) each said separate driver electrically associated with a said light source in said source array and adapted to receive an input signal from a network node, (c) said detector, and (d) receiver electronics for outputting a signal from said detector to a network node.

15. The optical communicating apparatus of claim 2 wherein all pixels on a given plane are electrically connected to a network node.

16. The optical communicating apparatus of claim 2 wherein said pixels on a given plane are configured as either rows or columns and wherein each row or column is electrically connected to a network node.

17. The optical communicating apparatus of claim 16 wherein said pixels on each plane are configured alternatingly as either rows or columns, to permit communication between a single row or column node and all column or row nodes by combining both wavelength division multiplexing and space division multiplexing.

18. The optical communicating apparatus of claim 2 wherein each pixel on a given plane is electrically connected to a network node.

19. The optical communicating apparatus of claim 1 wherein each detector arranged behind another comprises a III–V compound semiconductor of different composition so as to provide said wavelength selectivity.

20. The optical communicating apparatus of claim 19 wherein each said detector comprises material selected from the group consisting of $Ga_xAl_{1-x}As$, and $In_xGa_{1-x}As$, and $In_xGa_{1-x}As_yP_{1-y}$, where the values of x and y are independently varied to provide said wavelength selectivity.

21. The optical communicating apparatus of claim 1 wherein each detector arranged behind another comprises a III–V compound semiconductor quantum well detector so as to steepen the detector roll-off at long wavelengths and to provide said wavelength selectivity.

22. The optical communicating apparatus of claim 21 wherein each said detector comprises material selected from the group consisting of $Ga_xAl_{1-x}As$, $In_xGa_{1-x}As$ and $In_x\text{—}Ga_{1-x}As_yP_{1-y}$, where the values of x and y are independently varied to provide said wavelength selectivity.

23. Optical communication apparatus for simultaneously and reconfigurably establishing optical communication channels, comprising:

(a) at least one two-dimensional transmitting plane, each transmitting plane provided with a plurality of pixels, each pixel comprising an identical source array comprising a plurality of vertical-cavity surface-emitting lasers, each laser emitting at a different wavelength from the other in that array, each plane comprising a substrate consisting essentially of semiconductor material transparent to all wavelengths emitted;

(b) at least two two-dimensional detector planes, each detector plane behind another and all detector planes behind said at least one transmitting plane, each detector plane provided with a plurality of said wavelength-selective detectors, each detector on each of said two-dimensional detector planes associated with a given pixel on a previous said two-dimensional transmitting plane and having a cut-off in wavelength detection that increases in wavelength for detector planes further away from said transmitting plane, each detector comprising a III–V compound semiconductor of different composition so as to provide said wavelength selectivity, each plane comprising a substrate consisting essentially of semiconductor material transparent to all wavelengths emitted; and (c) a plurality of supporting substrates separating said planes, said substrates comprising a material transparent to all wavelengths emitted.

24. The optical communicating apparatus of claim 23 wherein each plane consists essentially of semiconductor material selected from the group consisting of GaAs, InP, and Si.

25. The optical communicating apparatus of claim 23 wherein each detector comprises a material selected from the group consisting of $Ga_{1-x}Al_xAs$, $In_xGa_{1-x}As$, and $In_xGa_{1-x}As_yP_{1-y}$, where the values of x and y are independently varied to provide said wavelength selectivity.

26. Optical communication apparatus for simultaneously and reconfigurably establishing optical communication channels, comprising a plurality of pixels, each said pixel including an identical source array, each said array comprising a plurality of light sources, each said light source operating at a different wavelength and each said array optically associated with a plurality of wavelength-selective detectors, each said wavelength-selective detectors in said plurality wave-length-selective detectors having a different spectral response, arranged one behind another, and having a cut-off in wavelength detection that increases in wavelength for wavelength-selective detectors further away from said plurality of light sources.

* * * * *